United States Patent
Pentek et al.

(10) Patent No.: US 8,252,190 B2
(45) Date of Patent: Aug. 28, 2012

(54) METHOD FOR MANUFACTURING A MAGNETIC WRITE HEAD HAVING A HARD MASK DEFINED WRITE POLE TRAILING EDGE STEP

(75) Inventors: Aron Pentek, San Jose, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 885 days.

(21) Appl. No.: 12/343,720

(22) Filed: Dec. 24, 2008

(65) Prior Publication Data
US 2010/0155367 A1 Jun. 24, 2010

(51) Int. Cl.
*B44C 1/22* (2006.01)
*G11B 5/127* (2006.01)
*H04R 31/00* (2006.01)
(52) U.S. Cl. ............ 216/22; 29/603.16; 29/603.18
(58) Field of Classification Search .......... 216/22
See application file for complete search history.

(56) References Cited

U.S. PATENT DOCUMENTS

| | | | |
|---|---|---|---|
| 7,181,829 B2 * | 2/2007 | Takahashi et al. | 29/603.15 |
| 7,296,338 B2 | 11/2007 | Le et al. | 29/603.16 |
| 2006/0002021 A1 * | 1/2006 | Li et al. | 360/126 |
| 2006/0203395 A1 | 9/2006 | Guan et al. | 360/319 |
| 2007/0115583 A1 | 5/2007 | Bonhote et al. | 360/126 |
| 2008/0278852 A1 * | 11/2008 | Kim et al. | 360/119.02 |

OTHER PUBLICATIONS

Y. Chen et al., "High Moment Materials and Fabrication Processes for Shielded Perpendicular Write Head Beyond 200 Gb/in$^2$" IEEE Transactions on Magnetics, vol. 43, No. 2, Feb. 2007.

* cited by examiner

*Primary Examiner* — Binh X Tran
*Assistant Examiner* — Thomas Pham
(74) *Attorney, Agent, or Firm* — Zilka-Kotab, PC

(57) ABSTRACT

A method for manufacturing a magnetic write head having a write pole with a tapered trailing edge step. The resulting tapered trailing edge step maximizes write field at very small bit sizes by preventing the magnetic saturation of the write pole at the pole tip. The method includes depositing a magnetic write pole material and then depositing a magnetic material over the magnetic write pole material. A RIE mask and hard mask are deposited over the magnetic bump material. A resist mask is formed over the RIE mask and hard mask, and a reactive ion etching is performed to transfer the pattern of the resist mask onto the underlying hard mask. Then an ion milling is performed to form a the magnetic step layer with a tapered edge that defines a tapered trailing edge step structure of the write pole.

20 Claims, 21 Drawing Sheets

METHOD FOR MANUFACTURING A MAGNETIC WRITE HEAD HAVING A HARD MASK DEFINED WRITE POLE TRAILING EDGE STEP

FIELD OF THE INVENTION

The present invention relates to perpendicular magnetic recording and more particularly to a magnetic write head having a write pole with a tapered trailing edge for increased write field strength at small bit length dimensions.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides method for manufacturing a magnetic write head having a write pole with a tapered trailing edge step. The resulting tapered trailing edge step maximizes write field at very small bit sizes by preventing the magnetic saturation of the write pole at the pole tip. The method includes depositing a magnetic write pole material and then depositing a magnetic material over the magnetic write pole material. A RIE mask and hard mask are deposited over the magnetic bump material. A resist mask is formed over the RIE mask and hard mask, and a reactive ion etching is performed to transfer the pattern of the resist mask onto the underlying hard mask. Then an ion milling is performed to form a the magnetic step layer with a tapered edge that defines a tapered trailing edge step structure of the write pole.

A method according to the invention advantageously allows the magnetic tapered step to be defined before the write pole itself has been defined. This allows the bump to be formed without the additional topography that would be provided by the magnetic step.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
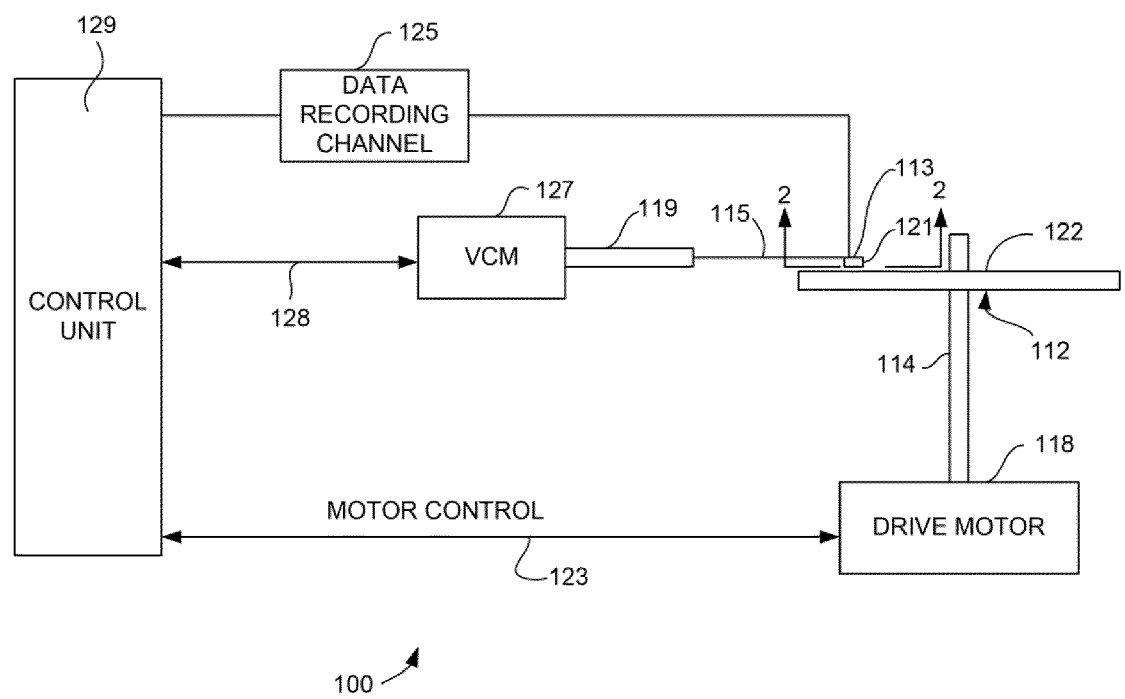
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
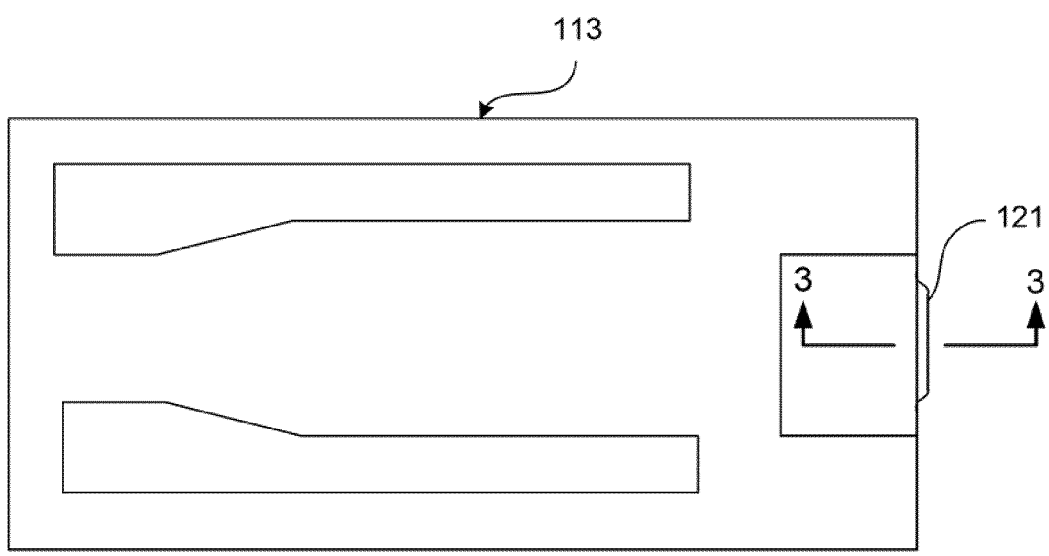
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
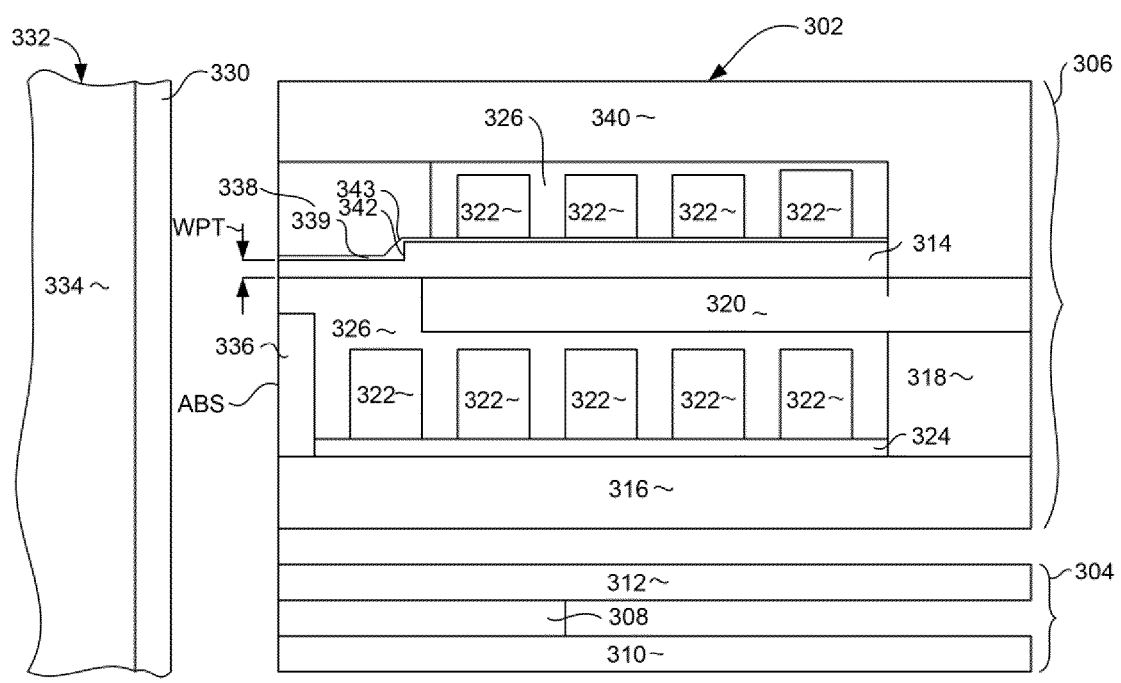
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

Figure 4:
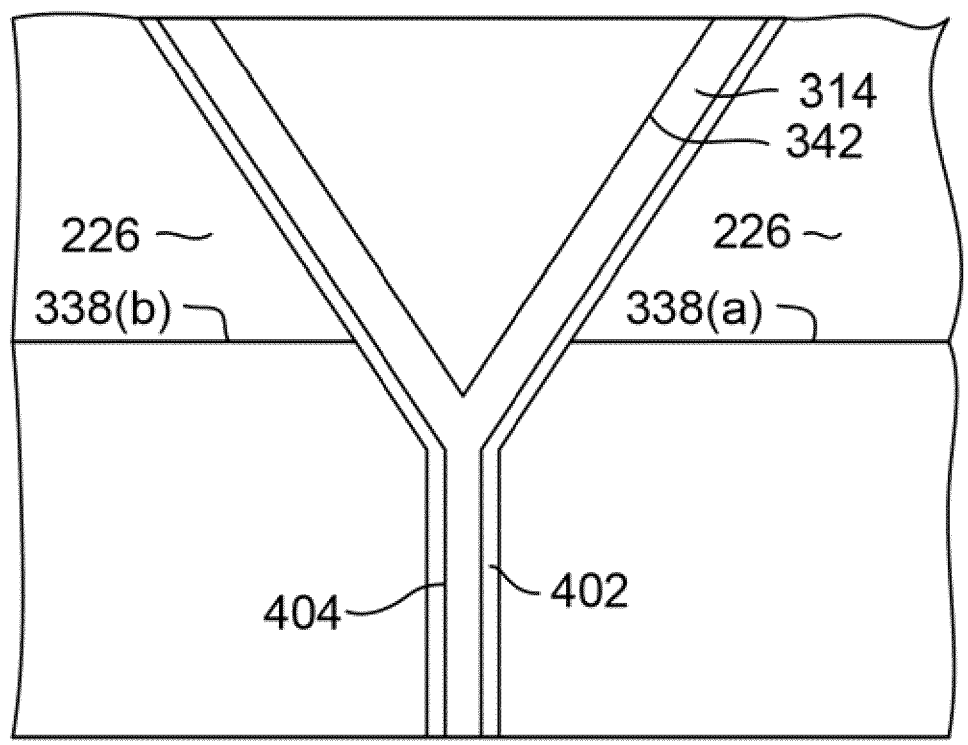
FIG. 4 is a top down view of a write pole of the magnetic head.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The shield 338 also has side shielding portions 338(a) and 338(b) that are separated from sides of the write pole by non-magnetic side gap layers 402, 404, which can be seen in the top down view of FIG. 4. The side portions of the shield 338 and side gap portions are not shown in FIG. 3, but will be described in greater detail herein below. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

In order to increase data density in a magnetic data recording system, the bit length of the recorded data bits must be decreased. This requires a reduction of the write pole thickness WPT as measured from the trailing edge to the leading edge of the write pole as shown in FIG. 3. However, this reduction in write pole thickness WPT risks magnetically saturating the write pole so that magnetic flux to the tip of the write pole 314 can become choked off, thereby reducing write field strength. In order to mitigate this, the write pole 314 has a stepped leading edge 342 where the thickness of the write pole increases at a location somewhat removed from the air bearing surface ABS. The location of the trailing edge step 342 is preferably behind the flare point. This can be seen more clearly with reference to FIG. 4, which shows a top down view of the write pole 314 and trailing edge step 342. With reference again to FIG. 3, the trailing shield 338 also has an advantageous tapered leading edge portion that tapers away from the write pole 314. This tapered configuration of the shield 338 provides optimal shield performance maximizing field gradient while minimizing the loss of write field to the shield 338.

Figure 5:
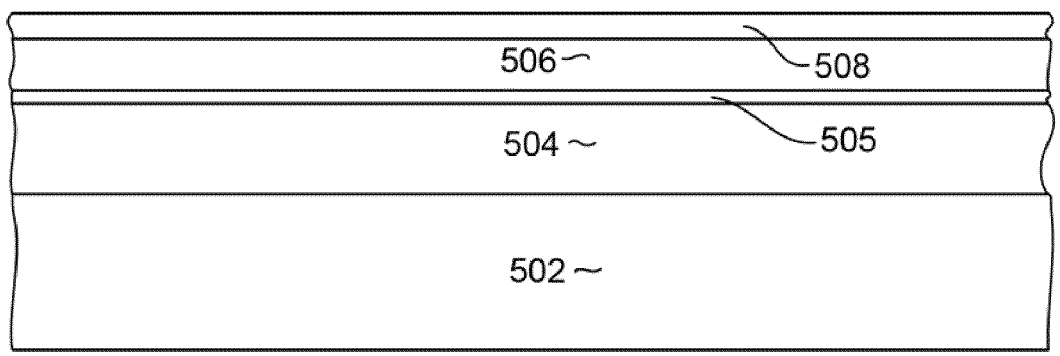
FIGS. 5-21 show a portion of a write head in various intermediate stages of manufacture illustrating a method for manufacturing a write head according to an embodiment of the invention.

FIGS. 5-15 illustrate a method for manufacturing a magnetic write pole having a trailing edge step or taper according to an embodiment of the invention. With particular reference to FIG. 5, a substrate 502 is provided. The substrate 502 can include the insulating fill layer 326 and all of a portion of the shaping layer 320 described above with reference to FIG. 3. A magnetic write pole material layer 504 is deposited over the substrate. The write pole material layer 504 can be a lamination of layers of high magnetic moment material such as CoFe separated by thin non-magnetic layers. This lamination of layers helps to reduce magnetic domain formation and increases switching speed. An end point detection layer 505 is deposited over the top of the magnetic write pole material 504. The end point detection layer 505 can be a magnetic material that is deposited sufficiently thin that it can act as one of the thin, non-magnetic layers (not shown) within the magnetic write pole lamination 504. The end point detection layer is also preferably a material that can be readily detected by a method such as Secondary Ion Mass Spectrometry (SIMS). For example, the end point detection layer can be Ni or NiCr and can have a thickness of 5 nm or less or about 2 nm.

With continued reference to FIG. 5, magnetic layer (magnetic step layer) 506 is deposited over the end point detection layer 505. The magnetic step layer 506 can be a high magnetic moment material such as CoFe and can be deposited to a thickness that will define the increased thickness of the write pole 314 at the step 342 (FIG. 3). The magnetic step layer 506 is preferably 40 to 100 nm thick or about 70 nm thick. A layer of material that is resistant to reactive ion etching (RIE stop layer) 508 is deposited over the magnetic step layer 306. The RIE stop layer 508 can be constructed of a non-magnetic material such as Rh, NiCr, Cr, Ru or Ir, and can be deposited to a thickness of 1-5 nm or about 2 nm.

Figure 6:
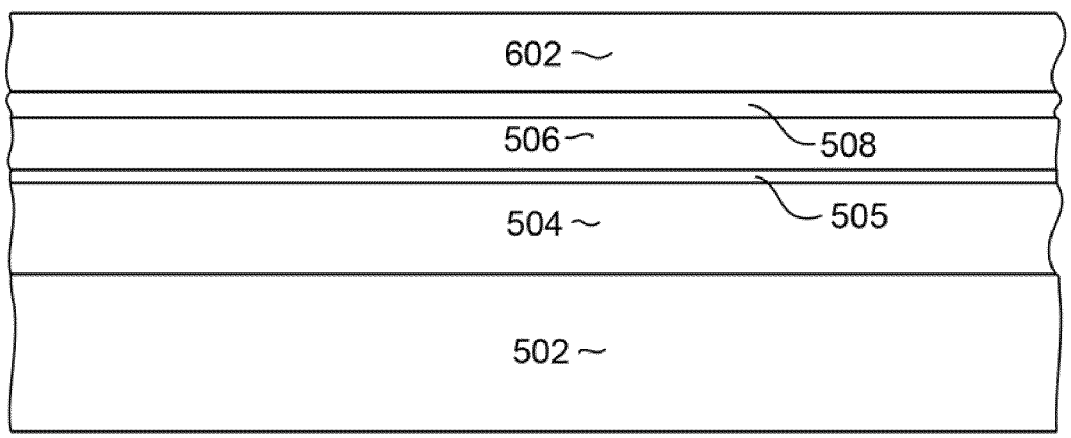
Figure 7:
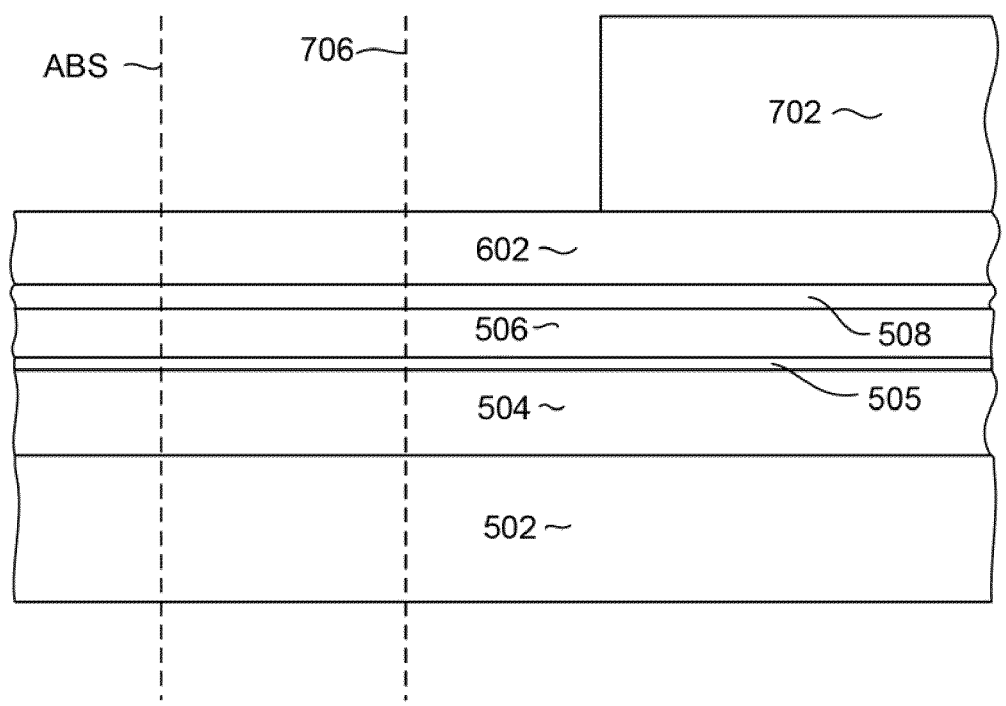
Figure 8:
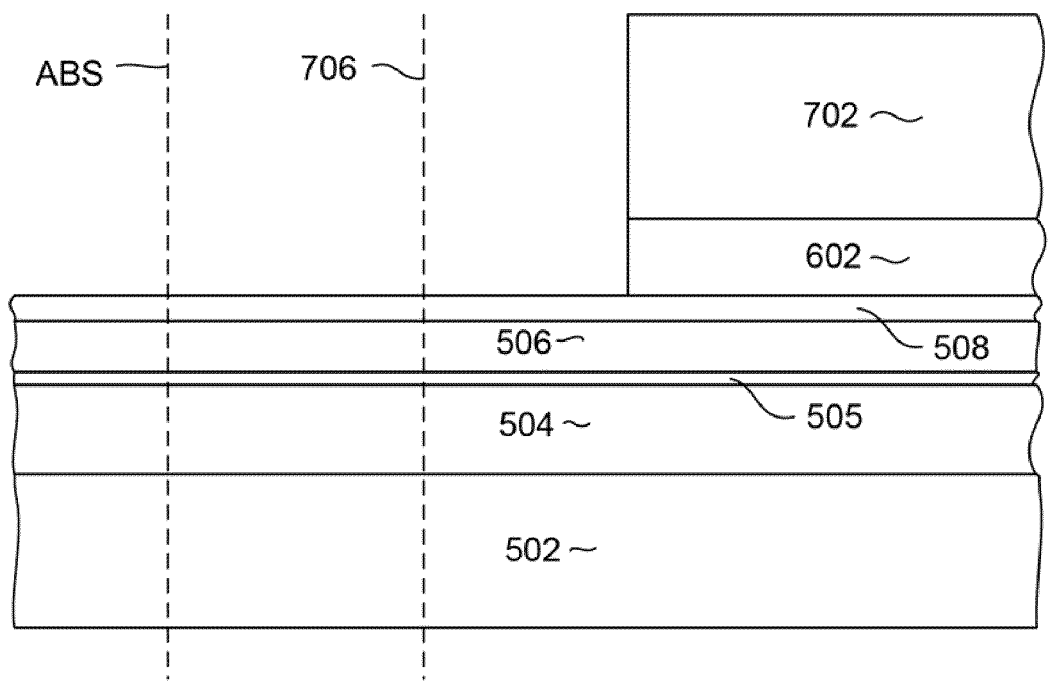
Figure 9:
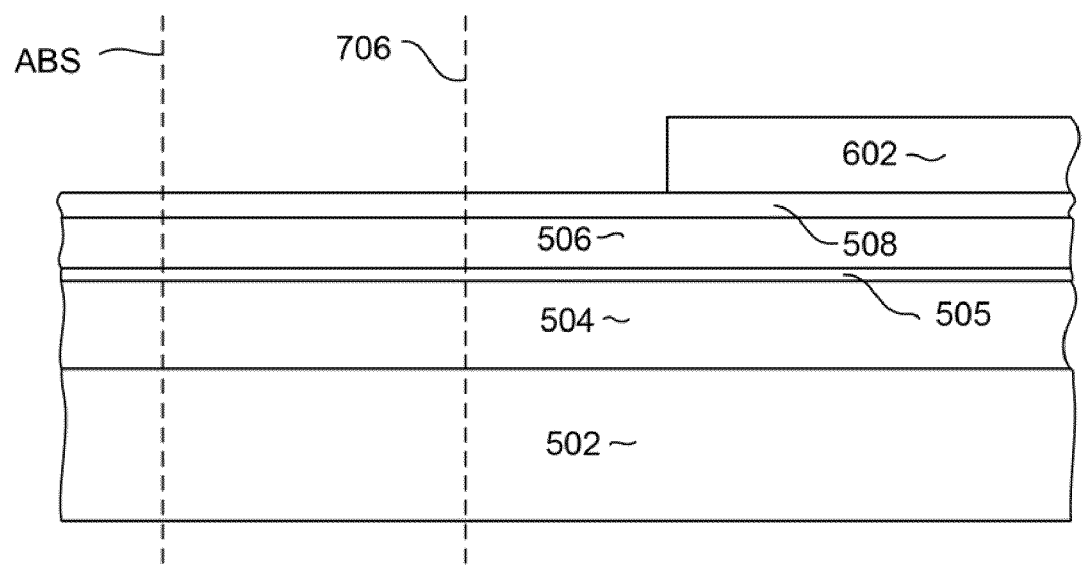

With reference now to FIG. 6 a hard mask layer 602 is deposited over the RIE stop layer 508. The hard mask layer 602 can be a material such as SiC, Alumina, Ta, TaO, diamond like carbon (DLC), $SiO_2$, SiN, etc., and can be deposited to a thickness of 20 to 300 nm. Then, with reference to FIG. 7, a mask structure 702 is formed over the hard mask 602. The mask structure can be a photolithographically patterned and developed photoresist mask and is formed to have a front edge 702 located so as to define a location of the front edge of the step 342 or taper (FIG. 3) as will become clearer below.

A reactive ion milling (RIE) can be performed to remove portions of the hard mask layer 602 that are not protected by the mask 702, stopping the REI when the RIE stop layer 508 has been reached. This results in as structure such as that shown in FIG. 7. The mask 702 can then be lifted off, such as by a chemical liftoff process, leaving a structure such as that shown in FIG. 9. As can be seen, the mask 702 has a front edge 704 that is located a desired distance form an intended air bearing surface plane (indicated by dashed line denoted ABS) and from an intended flare point location (indicated by dashed line 706.

Figure 21:
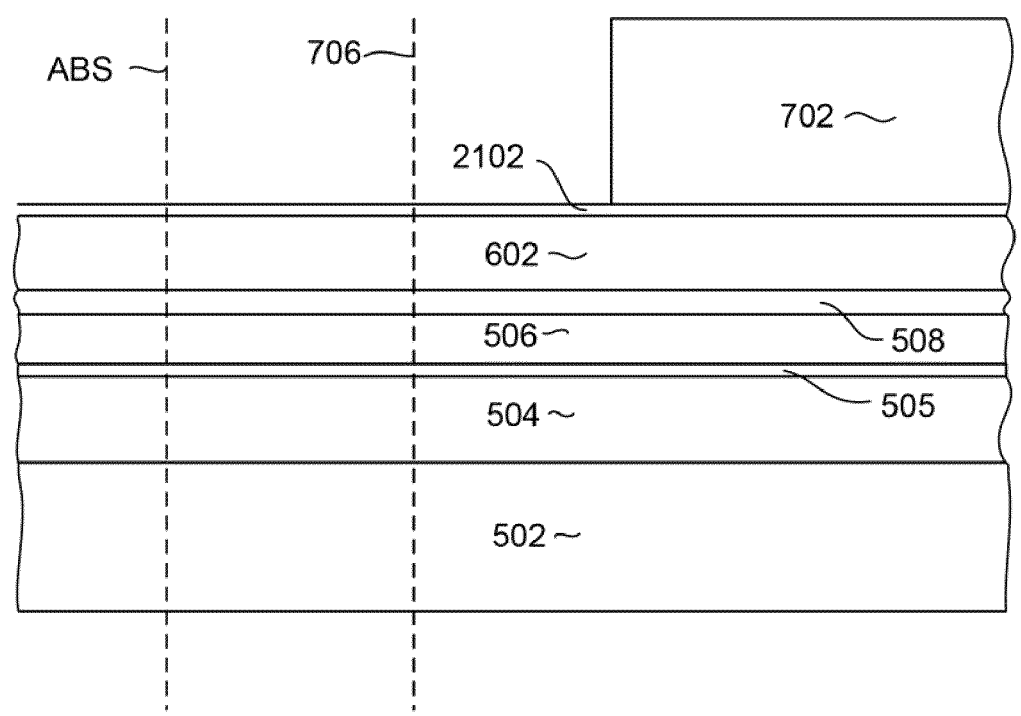

Alternatively, with reference to FIG. 21, the hard mask layer 602 can also be patterned through an image transfer process. In this case first a thin layer of material with low RIE rate 2102 is deposited over 602. This material can be a metal layer of Ni or NiCr and of thickness 5-25 nm. The Photolithographically patterned mask 702 is now formed over the metal layer. The metal layer 2102 is patterned by ion beam etch and the photoresist structure 702 is lifted off by a chemical process. Now the thin metal layer 2102 is used as a RIE mask to pattern the hard mask layer 602 resulting in a structure similar to that shown in FIG. 9.

Figure 10:
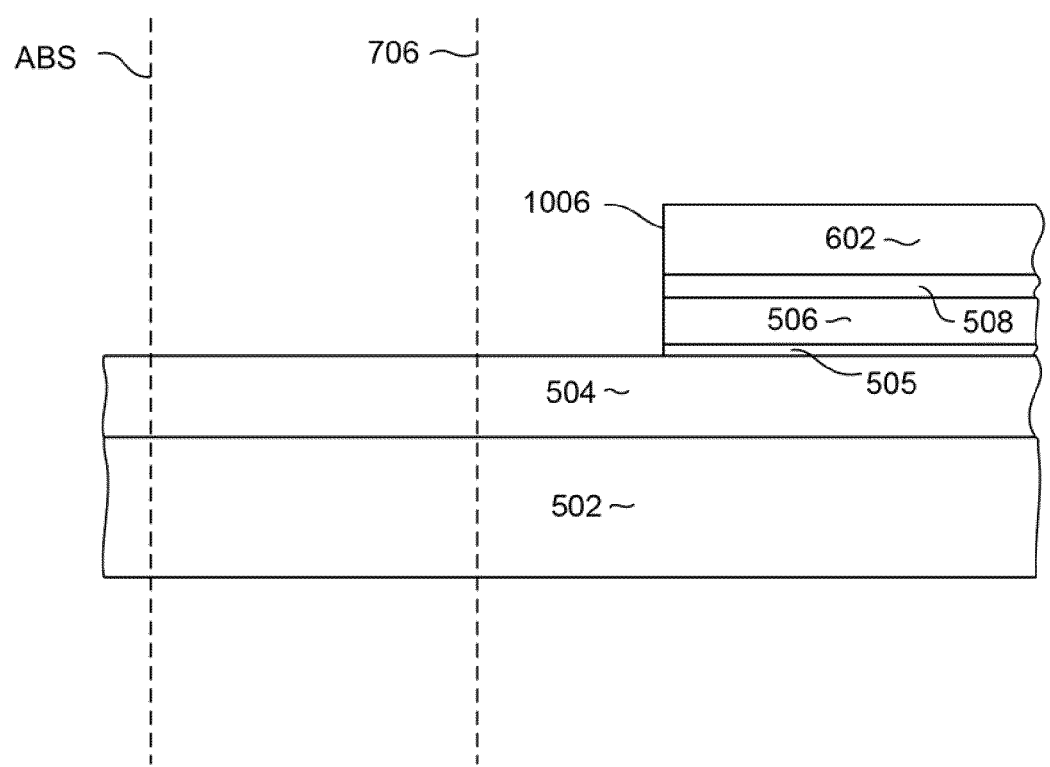

With reference to FIG. 10, an ion milling process can be performed to remove portions of the RIE stop layer 508 and magnetic step material 506 that are not protected by the hard mask 602. The ion milling can be terminated when the end point detection layer 505 has been reached. A process such as Secondary Ion mass Spectrometry can be used to detect when the ion milling should be terminated. This results in a structure such as that shown in FIG. 10. In FIG. 10, the location of the yet to be formed write pole flare point is indicated by dashed line 1002 and the location of an intended air bearing surface plane is indicated by dashed line 1004. It can be seen that the remaining magnetic step layer 506 has a front edge 1006 that is behind the flare point location. That is to say, the front edge 1006 of the magnetic step portion 506 is further from the ABS than the flare point 1002 is.

Figure 11:
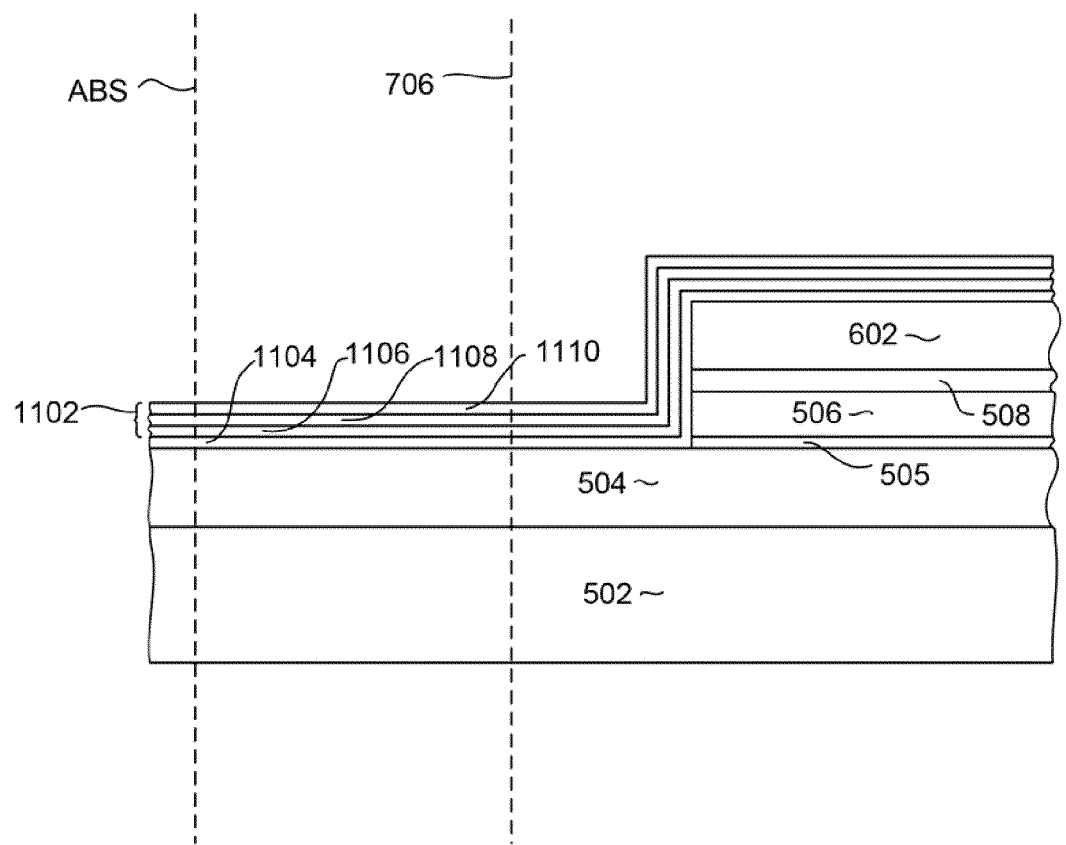

With reference now to FIG. 11, a series of layers 1102 is deposited. The series of layers 1102 can include a first layer 1104, second layer 1106, third layer 1108 and fourth layer 1110. The first layer 1104 can be a layer that will function as a part of a non-magnetic trailing gap layer and can be a layer of alumina ($Al_2O_3$). The second layer 1106 can be constructed of a hard mask material such as diamond like carbon (DLC) and can be deposited to a thickness of 10-30 nm. The third layer 1108 can function as an end point detection layer. This layer 1108 can be thin, such as 2-5 nm, and can be constructed of a material that can be easily detected by an end point detection scheme such as Secondary Ion Mass Spectrometry (SIMS). For example, the end point detection layer 1108 can be constructed of Ni, NiCr, Ta, Rh. The fourth layer 1110 can be a second hard mask layer such as alumina. This layer can be deposited to a thickness of 10-40 nm.

Figure 12:
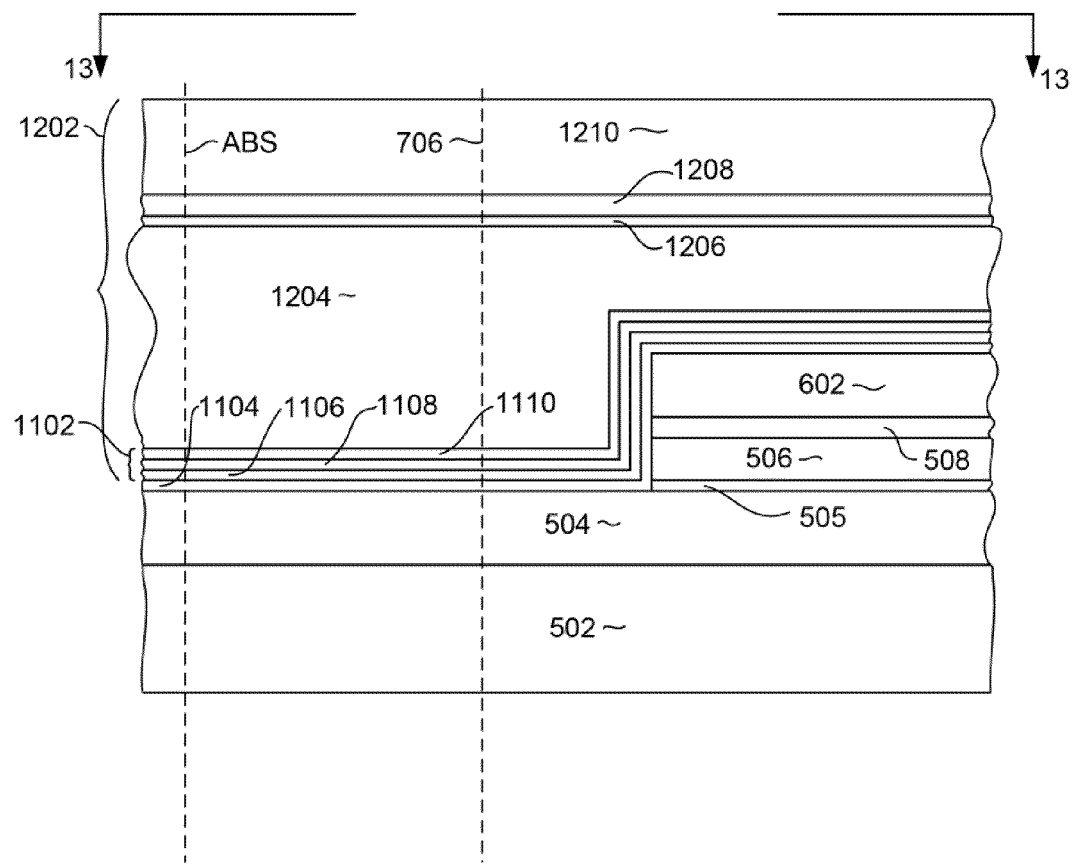
Figure 13:
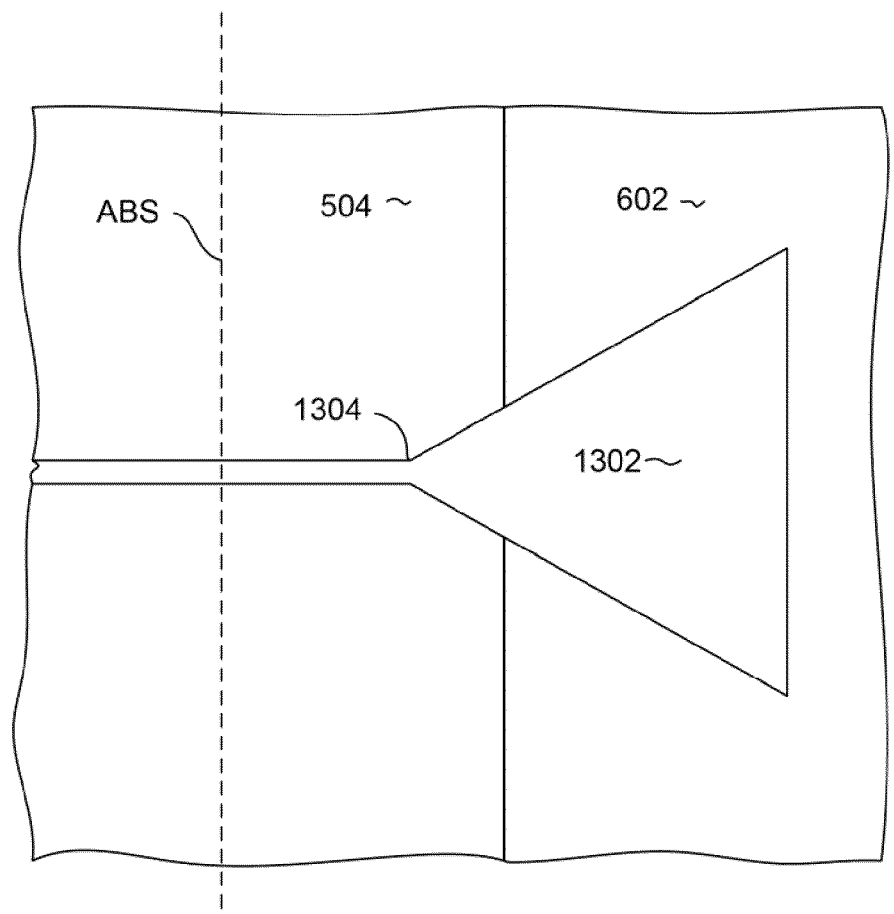

With reference now to FIG. 12, a series of mask layers 1202 are formed over the layers 1102. The mask layers 1202 can include an image transfer layer 1204, which can be constructed of a soluble polyimide material such as DURAMIDE®. This layer 1204 can be constructed somewhat thick. A hard mask layer 1306 such as $SiO_2$ can be deposited over the image transfer layer 1204. A bottom antireflective coating (BARC) layer 1208 can be deposited over the second hard mask. This BARC layer 1208 can be constructed of the same material as the image transfer layer 1204 (e.g. DURAMIDE®). Finally, a photoresist layer 1210 can be deposited over the BARC layer 1208.

The pohotoresist layer 1210 is photolithographically patterned to a desired write pole shape, and the image of this patterned resist layer 1210 is then transferred onto the underlying layers 1204, 1206, 1208 by a material removal process that may include one or more of ion milling or reactive ion etching. The pattern of the resulting mask structure can be seen more clearly with reference to FIG. 13, which shows a top-down view as taken from line 13-13 of FIG. 12. As can be seen, the mask 1202 defines a flare point at location 1304.

Figure 14:
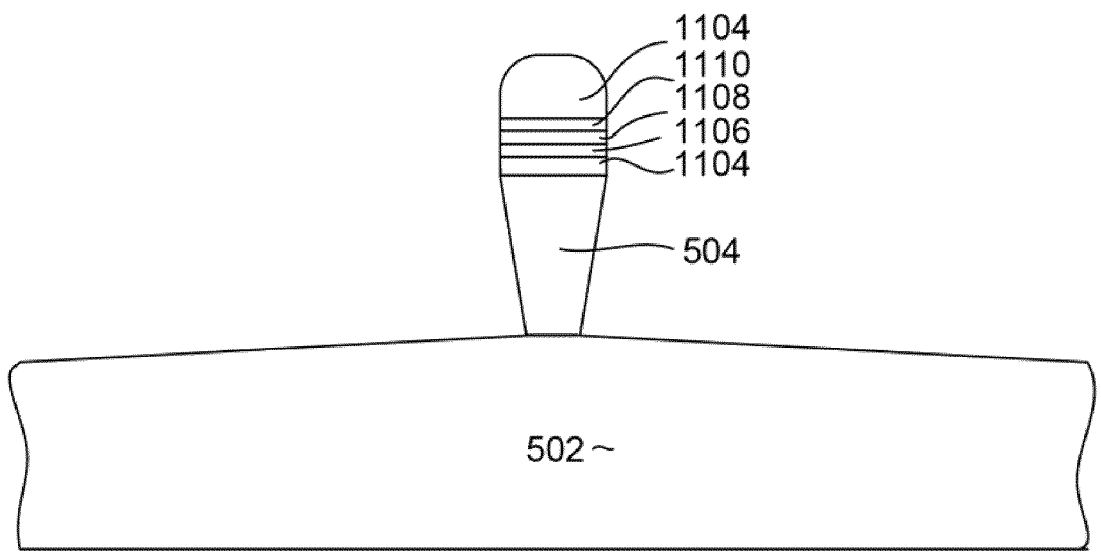
Figure 15:
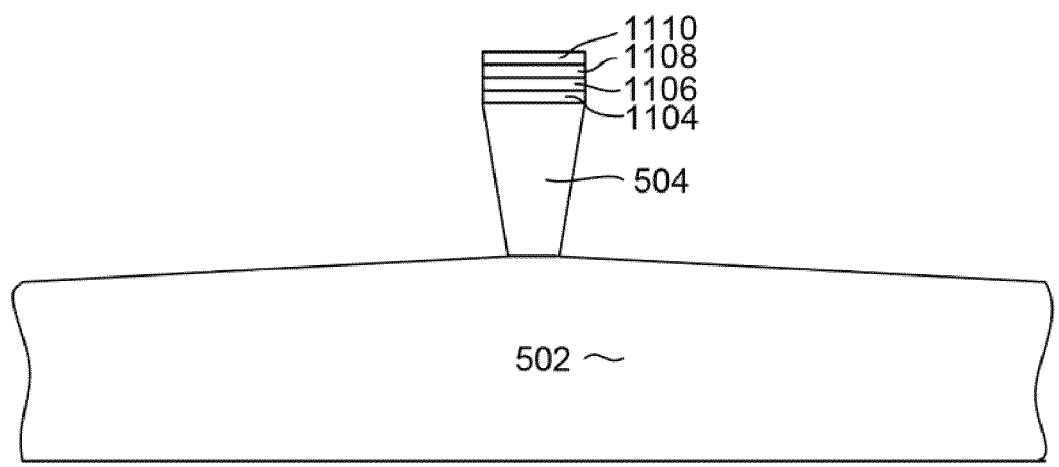

An ion milling can then be performed to remove portions of the layer 1404, 1406, 1408, 1410 and magnetic write pole layer 504 to form a write pole, which can be seen more clearly with reference to FIG. 14, which shows a cross sectional view of the pole tip portion of the write pole 504 viewing a plane that is parallel with the air bearing surface (ABS). As can be seen, the ion milling removes the photoresist 1210, BARC layer 1208, hard mask 1206 and a portion of the image transfer layer 1204 (FIG. 12), leaving the structure shown in FIG. 14. The ion milling can be a sweeping ion milling, performed at an angle relative to normal in order to form the write pole 504 with tapered sides as shown in FIG. 14. Then, the remaining image transfer layer 1204 can be removed, leaving the structure shown in FIG. 15.

Figure 16:
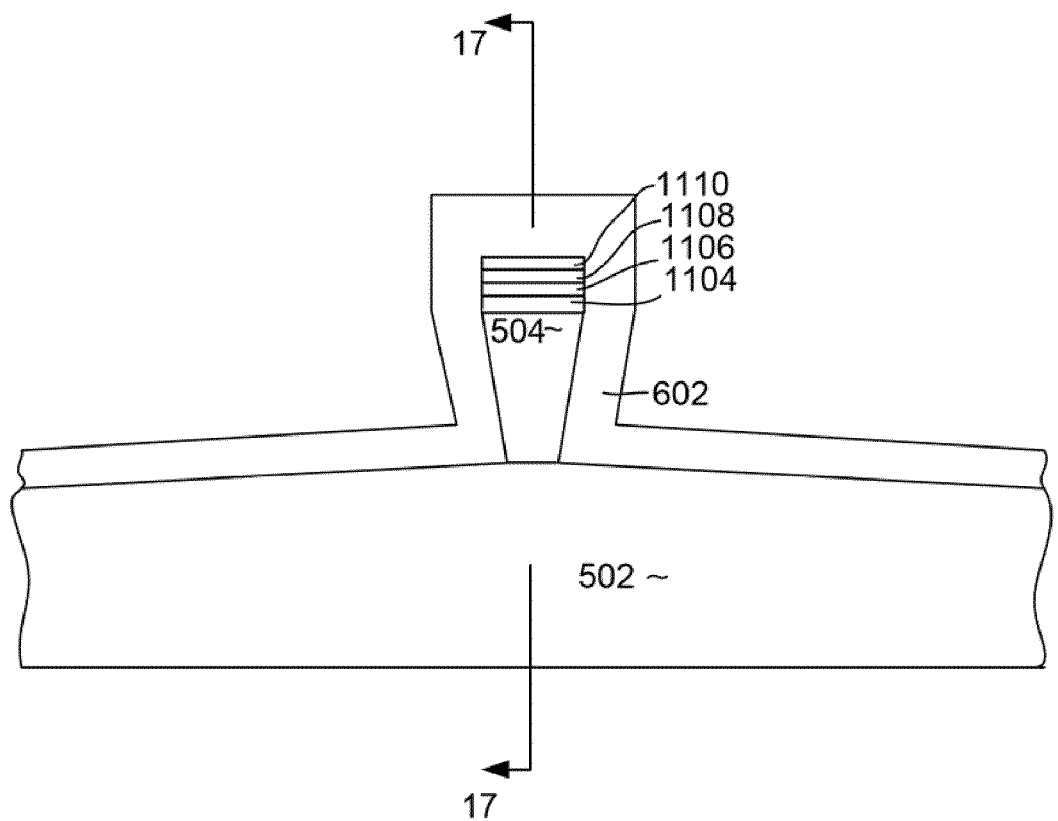
Figure 17:
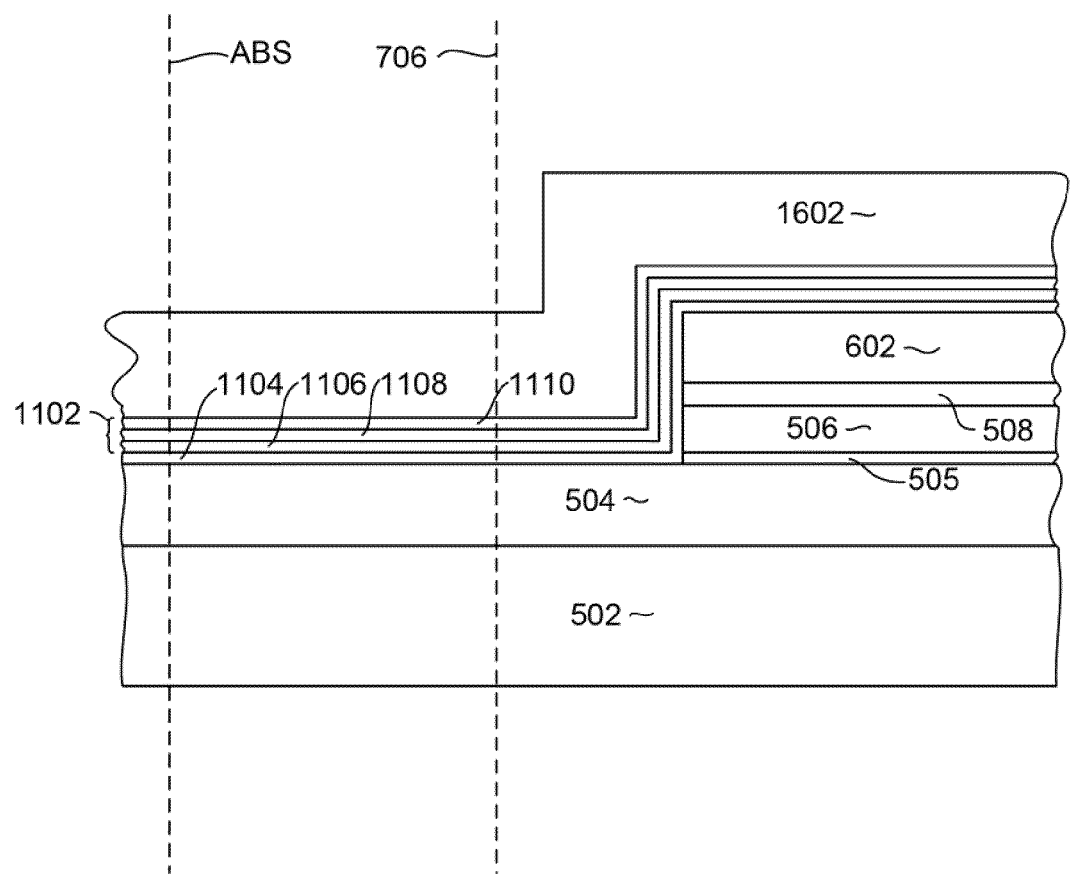
Figure 18:
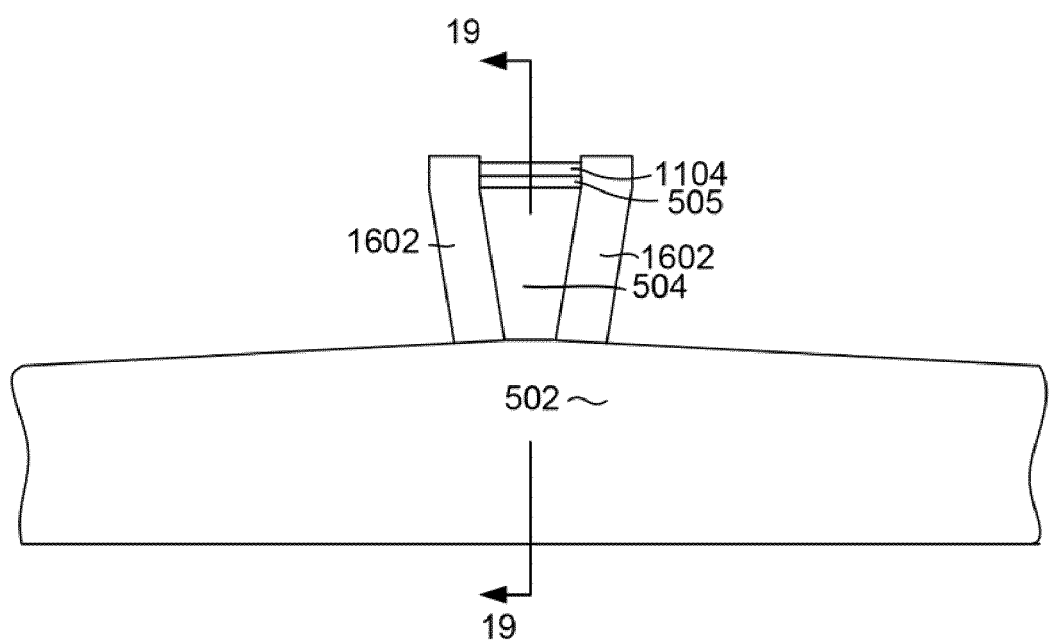

With reference now to FIG. 16 a layer of alumina 1602 is deposited by a conformal deposition process such as atomic layer deposition (ALD). This alumina layer can also be seen in FIG. 17, which shows a cross sectional view taken from line 17-17 of FIG. 16. Then, a direction material removal process such as ion milling is performed to preferentially remove horizontally disposed portions of the alumina layer 1602, thereby leaving alumina side walls as shown in FIG. 18. A reactive ion etch is then performed to remove the second hard mask layer 1106 leaving a small notch as seen in FIG. 18

Figure 19:
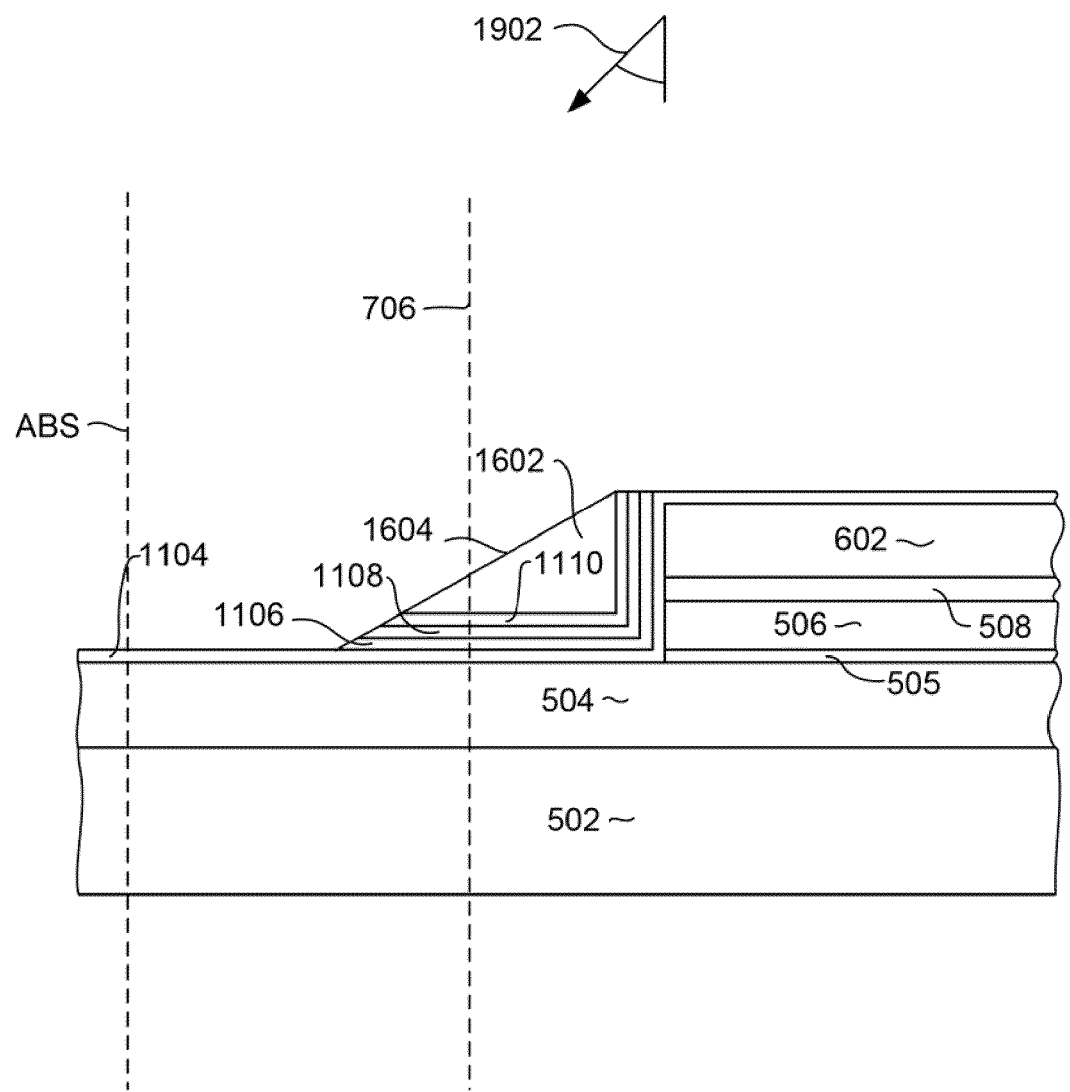

FIG. 19 is a cross sectional view taken from line 19-19 of FIG. 18. The ion milling described above with reference to FIG. 18, can be a sweeping ion milling, performed at an angle 1902 relative to normal. This angled, sweeping ion milling results in a wedge of the remaining alumina being formed over the write pole. The wedge of alumina 1602 has a tapered surface 1604, which can be useful in forming a tapered leading edge on a trailing magnetic shield, as will be seen below. This angled ion milling can be performed until the end point detection layer 1408 has been detected and removed. A follow-on RIE step removes the second mask layer 1406, thereby leaving the alumina hard mask layer 1404 in areas outside of the alumina wedge 1602. This remaining alumina hard mask 1404 can provide a portion of a non-magnetic trailing gap layer for a trailing shield that has yet to be formed.

Figure 20:
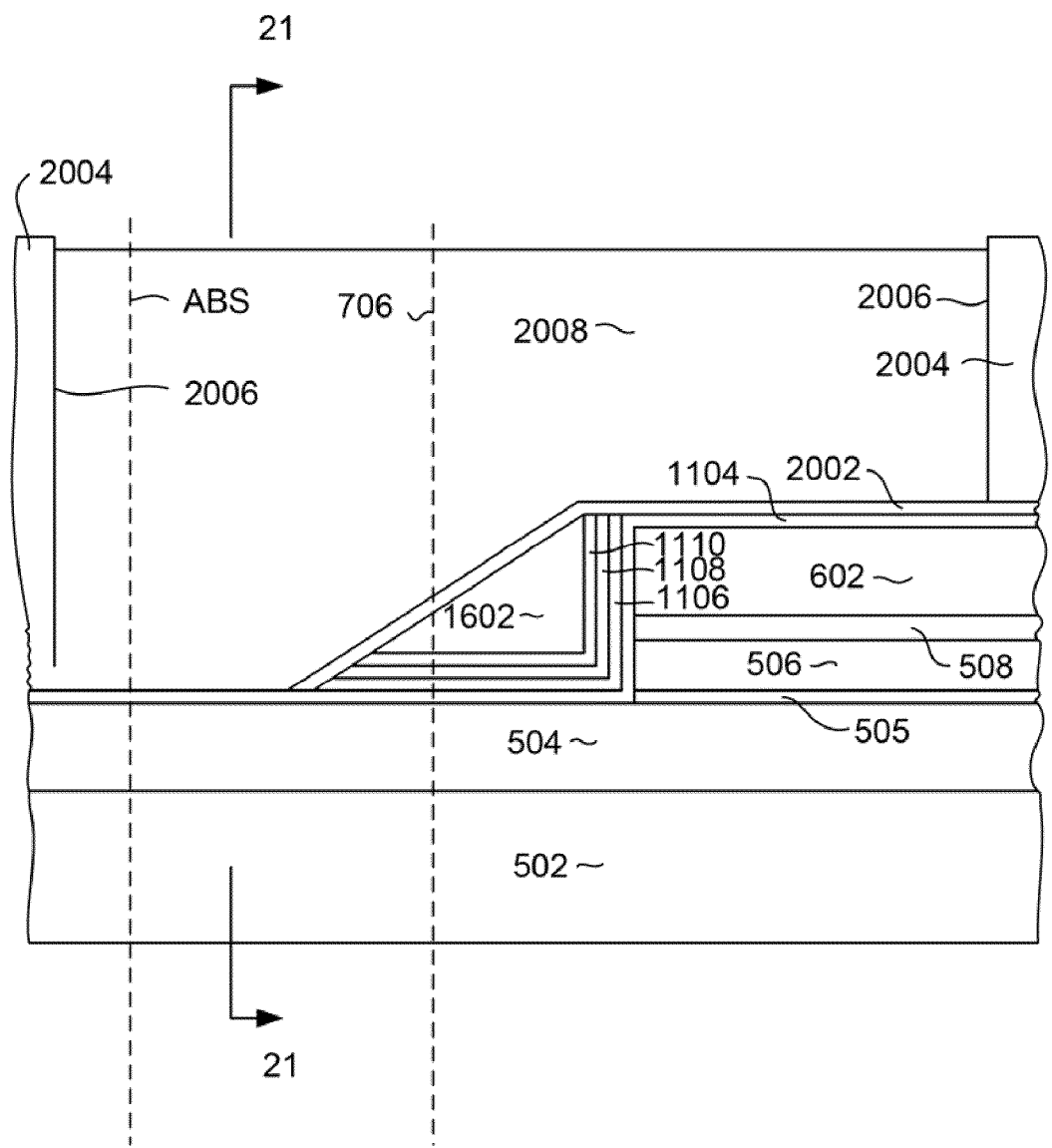

With reference now to FIG. 20, a seed layer 2002 is deposited. The seed layer 2002 can be an electrically conductive non-magnetic material such as Ru or Rh. Then, an electroplating frame mask such as a photoresist mask 2004 can be formed having an opening 2006 that is configured to define a trailing, wrap around magnetic shield. Then a magnetic material such as CoFe or NiFe can be electroplated into the opening 2006 in the mask 2004 to form a trailing, wrap-around magnetic shield 2008. The mask 2004 can then be lifted off, and a material removal process such as reactive ion beam etch, can be performed to remove unwanted remaining portions of the seed layer 2002.

The above described process forms a write head having a write pole 504 with a magnetic step 2010 that can be accurately located relative to the flare point location 706 and also relative to the ABS. The method also forms a trailing, wrap-around magnetic shield 2008 that advantageously tapers away from the write pole as shown in FIG. 20. This configuration of the write pole 504 and shield 2008 provides optimal performance at very small bit sizes.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
providing a substrate;
depositing a magnetic write pole material over the substrate;
depositing a magnetic step material over the magnetic write pole material;
depositing a first layer of material that is resistant to reactive ion etching over the magnetic step material;
depositing a first hard mask material over the first layer of material that is resistant to reactive ion etching;
forming a first mask structure over the first hard mask material, the mask structure having a front edge located so as to define a write pole step location;
performing a reactive ion etching to transfer the image of the first mask structure onto the first hard mask material, stopping the reaction ion etching at the first RIE stop layer;
performing a first ion milling to remove portions of the magnetic step material that are not protected by the first mask structure;
forming a second mask configured to define a write pole flare point; and
performing a second ion milling to remove portions of the magnetic write pole material that are not protected by the second mask thereby forming a write pole with the flare point.

2. A method as in claim 1 further comprising, after performing the reactive ion etching and before forming the second mask, depositing a multilayer structure that includes a layer first layer of alumina, a second layer of diamond like carbon formed over the first alumina layer, a third end point detection layer deposited over the end point detection layer, and a second layer of alumina formed over the end point detection layer.

3. A method as in claim 2 wherein the second mask further comprises an image transfer layer, a SiO2 hard mask formed over the image transfer layer, a bottom antireflective coating layer, and a photoresist layer.

4. A method as in claim 2 further comprising, after performing the second ion milling, conformally depositing an alumina layer and performing a third ion milling.

5. A method as in claim 4 wherein the third ion milling is a sweeping ion milling performed at an angle relative to normal.

6. A method as in claim 1 further comprising after depositing the magnetic write pole material and before depositing the magnetic step material, depositing an end point detection layer.

7. A method as in claim 6 wherein the end point detection layer is used to determine when the first ion milling should be terminated.

8. A method as in claim 1 wherein the first hard mask material is a non-magnetic material.

9. A method as in claim 1 wherein the first hard mask material comprises $Al_2O_3$, Ta, TaO, DLC, $SiO_2$, SiC, or SiN.

10. A method as in claim 1 wherein the first hard mask material is a non-magnetic material and has a thickness of 20-300 nm.

11. A method as in claim 1 wherein the first mask structure comprises a photolithographically patterned and developed photoresist.

12. A method as in claim 1 further comprising, after performing the reactive ion etching, and before performing the first ion milling, removing the first mask structure.

13. A method as in claim 1 wherein the first RIE stop layer comprises Ni, NiCr.

14. A method as in claim 1 wherein the first RIE stop layer has a thickness of 5 nm or less.

15. A method as in claim 1 further comprising, after performing the reactive ion etching and before forming the second mask, depositing a second hard mask.

16. A method as in claim 1 further comprising, after performing the reactive ion etching and before forming the second mask, depositing a multilayer hard mask structure.

17. A method as in claim 1, further comprising after depositing the first hard mask material and before forming the first mask structure, depositing a thin layer of material that is resistant to reactive ion etching, then performing an ion beam etching to transfer the image of the first mask structure onto the thin layer of material that is resistant to reactive ion etching.

18. A method as in claim 1 wherein the thin layer of material that is resistant to reactive ion etching, comprises a metal.

19. A method as in claim 1 wherein the thin layer of material that is resistant to reactive ion etching, comprises Ni or NiCr.

20. A method as in claim 1 wherein the thin layer of material that is resistant to reactive ion etching, comprises Ni or NiCr having a thickness of 5-25 nm.

* * * * *